United States Patent [19]

Petersen et al.

[11] 4,127,400

[45] Nov. 28, 1978

[54] PROCESS OF MANUFACTURING NON-GELLING SUSPENSION LIQUID FERTILIZERS

[75] Inventors: Alfred W. Petersen, Salt Lake City; Robert B. Calvin, Granger, both of Utah

[73] Assignee: Stauffer Chemical Company, Westport, Conn.

[21] Appl. No.: 516,301

[22] Filed: Oct. 21, 1974

Related U.S. Application Data

[63] Continuation of Ser. No. 376,647, Jul. 5, 1973, abandoned, which is a continuation of Ser. No. 267,817, Jun. 30, 1972, abandoned, which is a continuation of Ser. No. 52,777, Jul. 6, 1970, abandoned.

[51] Int. Cl.$^2$ .............................................. C05B 7/00
[52] U.S. Cl. ........................................ 71/34; 71/64 C
[58] Field of Search ............................ 71/1, 34, 64 C

[56] References Cited

U.S. PATENT DOCUMENTS

| | | | |
|---|---|---|---|
| 2,950,961 | 8/1960 | Striplin et al. | 71/34 X |
| 3,109,729 | 11/1963 | Slack et al. | 71/34 X |
| 3,179,496 | 4/1965 | Skinner et al. | 71/34 X |
| 3,813,233 | 5/1974 | Kendrick, Jr. | 71/34 |

*Primary Examiner*—Ferris H. Lander
*Attorney, Agent, or Firm*—Daniel C. Block

[57] ABSTRACT

A process of manufacturing liquid fertilizer from ortho phosphoric acid is described herein. Specifically, the process involves extracting ortho phosphoric acid from phosphate rock using sulfuric acid in the usual manner. The ortho phosphoric acid is then concentrated to a $P_2O_5$ content of 30-58% by weight. The wet process ortho phosphoric acid is then ammoniated at a carefully controlled pH in a range of about 3.0 to 5.5. Water and commercial clays are added to the ammoniated phosphoric acid during ammoniation or after ammoniation. A stable non-gelling suspension fertilizer results.

4 Claims, No Drawings

PROCESS OF MANUFACTURING NON-GELLING SUSPENSION LIQUID FERTILIZERS

This is a continuation, of application Ser. No. 376,647 filed on July 5, 1973, which is a continuation of application Ser. No. 267,817, filed June 30, 1972 which was a continuation of application Ser. No. 52,777, filed July 6, 1970, all now abandoned.

BACKGROUND OF THE INVENTION

In the art of manufacturing liquid phosphoric acid, it is the usual practice to extract ortho phosphoric acid from phosphate rock. This is brought about by treating phosphate rock with sulfuric acid and filtering off the insoluble sulfates which are formed as a by-product. The crude ortho phosphoric acid formed is impure and contains small amounts of impure salts, such as aluminum iron and magnesium salts. The crude ortho phosphoric acid is concentrated to have a $P_2O_5$ content of between about 30 and 58% by weight.

The concentrated ortho phosphoric acid is then ammoniated to form a liquid fertilizer. When manufacturing liquid fertilizers by this manner, it has been a long recognized fact that the liquid fertilizer will gel on standing. Since these gels are thixotropic, they can be placed back in the liquid state by rigid agitation as is well known in the art.

In order to obviate this gelling problem of the ammoniated ortho phosphoric acids, it has been proposed to use expensive chelating agents which apparently complex the impurities present to maintain a stable solution. However, this approach has not been notably successful. Another approach to eliminating the gel problem was to use superphosphoric acid or polyphosphoric acid rather than the ortho phosphoric acid. However, by using these other forms of phosphoric acid, additional process steps are required which greatly increases the cost of the end product. Although other processes have been tried, to date there has been no known way in order to achieve a non-gelling stable suspension of ammoniated ortho phosphoric acid for use as a liquid fertilizer. Exemplary of the prior art processes as above noted can be found in U.S. Pat. Nos. 3,019,099, 3,160,495, 3,179,496, 3,377,153, 3,433,617.

DESCRIPTION OF THE INVENTION

In the practice of the present invention, wet process ortho phosphoric acid is obtained in the conventional manner. This is brought about by treating phosphate rock with sulfuric acid and then separating the solids therefrom. Then the wet process ortho phosphoric acid is concentrated to have a $P_2O_5$ content of about 30 to 58% by weight, preferably between about 34 and 54% by weight. Then, the wet process ortho phosphoric acid and ammonia are added simultaneously to a reaction vessel. Water may be added during and/or after ammoniation in order to obtain a desirable fluidity of the suspension. The ammoniation of the ortho phosphoric acid is exothermic and substantial amounts of heat removal is necessary. It is essential to the practice of the present invention that the amount of acid and the amount of ammonia added to the reaction vessel be regulated, such that the pH range within the reaction vessel is maintained at between about 3 and about 5.5, preferably between about 4.5 and 5.5. The resulting product is an aqueous ammonium phosphate having suspended therein some precipitated impure salts, such as aluminum, iron and magnesium salts. The product may also have ammonium phosphate salts suspended. This product is passed into another vessel wherein from about ⅓ to 3% by weight of conventional clays are added thereto to maintain the impurities in a suspended form. The clays usable are the conventional Attapulgite and Montmorillonite clays. Thus, a suspension liquid fertilizer is formed which does not gel upon standing. It has been found in practice that if the pH is maintained within the reaction vessel of above about 5.5, the end product will gel on standing.

After the suspension fertilizer is made in accordance with this invention, the final pH is adjusted at about 6.0–7.0 and preferably to about 6.2–6.6, which is the most suitable pH range for maximum solubility of the end product in water.

The salts of potash or nitrogen or other plant foods can be mixed with the suspension fertilizer without departing from the spirit of the invention. A non-gelling suspension results.

In order to illustrate the merits of the present invention the following examples are provided.

EXAMPLES

Several runs were made wherein wet process ortho phosphoric acid, ammonia and water were added to the reaction vessel at varying pH's. After each run, the end product was passed into a second vessel, wherein 1.5% by weight clay was added to the suspension. Then, each of the products were allowed to stand 24 hours. The end product was then checked for fluidity. The results of these tests are tabulated below.

Table I

| pH Range of Reaction | Adjusted Final pH | Condition After 24 Hours Standing |
| --- | --- | --- |
| 3.5–3.9 | 6.3 | Fluid - poured readily |
| 4.3–4.5 | 6.3 | Fluid - poured readily |
| 5.3–5.5 | 6.3 | Fluid - poured readily |
| 6.3–6.5 | 6.3 | Very thick - hard to pour |
| 7.0–7.3 | 6.3 | Set up - would not pour |
| 7.5–7.8 | 6.3 | Set up - would not pour |
| 8.2–8.5 | 6.3 | Set up - would not pour |
| 8.9–9.2 | 6.3 | Set up - would not pour |

As can be seen from the above actual runs, the pH range of between about 3 and 5.5 results in a clear superior end product. The pH of runs above 6 thickened readily and in fact set up at a pH of above 7, so that the end product could not be removed from the vessel.

What is claimed is:

1. A liquid fertilizer suspension comprising, ammoniated wet process ortho phosphoric acid, said ortho phosphoric acid having a $P_2O_5$ content of between 30 and 58% by weight, said suspension having between ⅓ and 3% by weight attapulgite clay dispersed therein, said suspension having a pH of between 6.2 and 6.6 and said suspension has non-gelling characteristics on standing; said suspension being manufactured by the following steps:
    (a) reacting the wet process ortho phosphoric acid, ammonia and water in a reaction vessel at a pH of between 3.5 and 5.5;
    (b) adding the clay to the resulting product;
    (c) adjusting the final pH to between 6.2 and 6.6.

2. The liquid fertilizer suspension of claim 1 wherein the pH of step (a) is between 4.5 and 5.5.

3. In a process for manufacturing liquid fertilizer wherein wet process ortho phosphoric acid having a $P_2O_5$ content ranging between about 30 and 58% by weight, ammonia and water are added to a reaction vessel to form ammoniated phosphoric acid; then, clay is added to the resulting product in an amount ranging between about ½ and 3% by weight;

the improvement comprising reacting the ortho phosphoric acid, ammonia and water at a pH range of between about 3.5 and 5.5.

4. The process as set forth in claim 3 wherein the pH of the reaction between the ortho phosphoric acid and ammonia is carried out at a pH range of between 4.5 and 5.5.

* * * * *